G. H. RUSSELL.
RAIL SAW.
APPLICATION FILED NOV. 18, 1918.
1,322,825.
Patented Nov. 25, 1919.
2 SHEETS—SHEET 1.
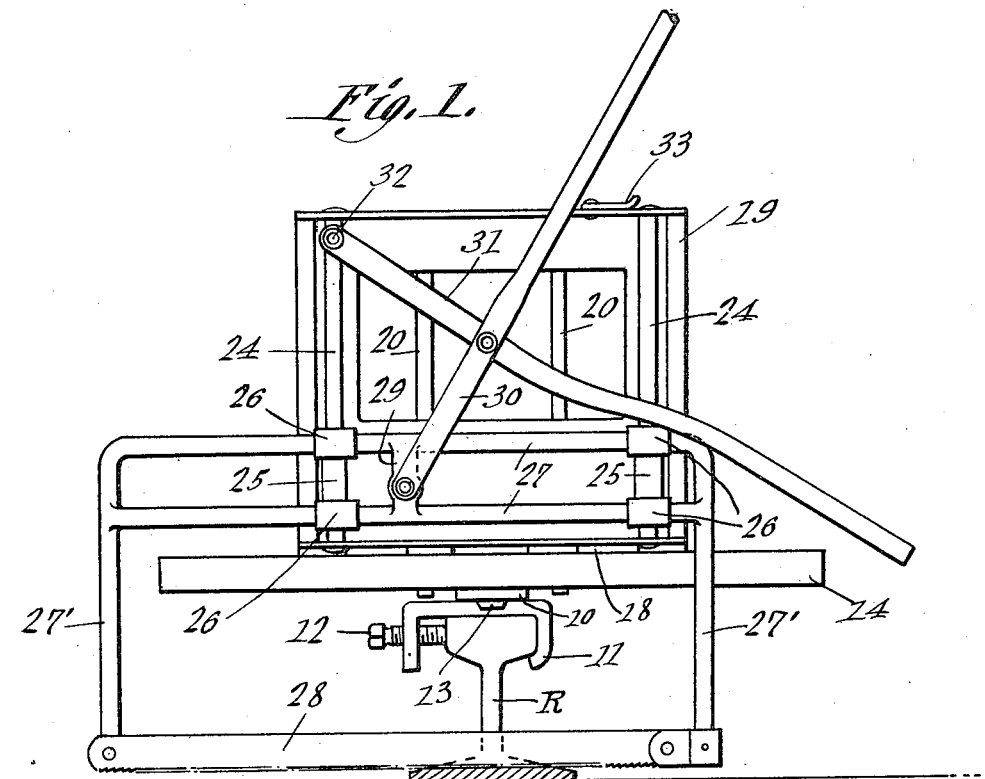
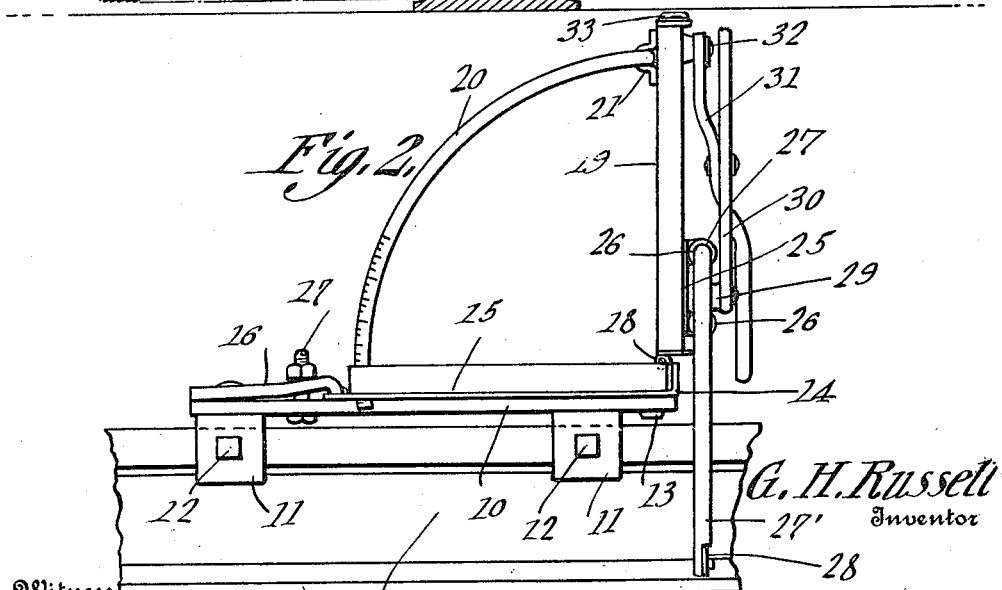
G. H. Russell
Inventor G. H. RUSSELL.
RAIL SAW.
APPLICATION FILED NOV. 18, 1918.
1,322,825.
Patented Nov. 25, 1919.
2 SHEETS—SHEET 2.
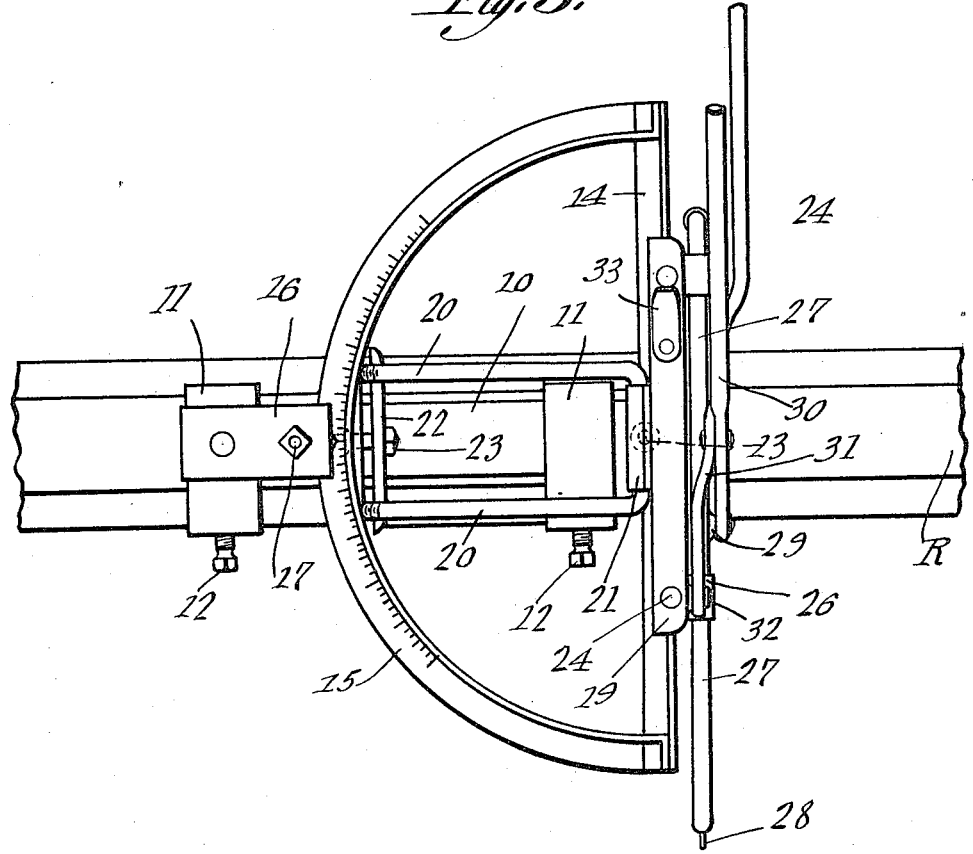
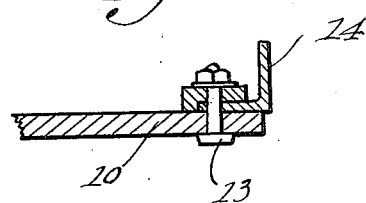
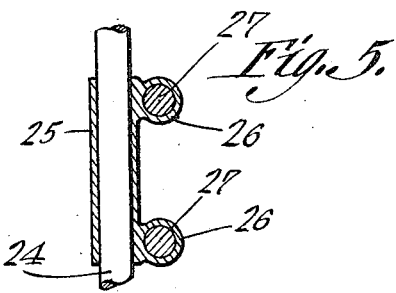
G. H. Russell
Inventor

UNITED STATES PATENT OFFICE.

GEORGE HENRY RUSSELL, OF FLORENCE, ALABAMA.

RAIL-SAW.

1,322,825.　　　　Specification of Letters Patent.　　Patented Nov. 25, 1919.

Application filed November 18, 1918. Serial No. 263,023.

*To all whom it may concern:*

Be it known that I, GEORGE H. RUSSELL, a citizen of the United States, residing at Florence, in the county of Lauderdale and State of Alabama, have invented a new and useful Rail-Saw, of which the following is a specification.

The subject of this invention is a rail saw intended for use in sawing railway rails or like metal bars or beams.

The main object of the invention is the provision of means for supporting a saw in position upon a rail and to swing the saw to cut the rail at desired angles of inclination to either the vertical or horizontal.

Another object of the invention is the provision of means for mounting the saw to slide vertically and horizontally.

Another object of the invention is the provision of means for reciprocating the saw to cut a rail, and means connected therewith for forcing the saw against the work.

The invention also contemplates generally improving the construction and enhancing the utility of rail saws.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical structure for carrying out the invention is illustrated in the accompanying drawings, wherein:—

Figure 1 is a view in side elevation of the device;

Fig. 2 is an end elevation viewed from the left of Fig. 1;

Fig. 3 is a plan view;

Fig. 4 is an enlarged detail view in vertical section of the connection between the main supporting bar and the cross bar;

Fig. 5 is an enlarged detail view partly in elevation, and partly in section, showing the sliding connection between the guide bars and the saw frame.

Referring to the drawings by characters of reference:—

In carrying out the invention there is provided a main supporting bar 10, from which depend the spaced clamps 11, which are adapted to straddle the ball of a rail R, and which are held firmly in place upon the ball of the rail by means of the set screws 12, or otherwise. The main supporting bar 10 has pivotal connection through a pin 13 with a cross bar 14, and is swingable in a horizontal plane about such pivot.

The ends of the cross bar 14 are connected by welding, or by other suitable method, to the ends of a semicircular member 15, preferably formed, as herein shown, of angle bar, with one flange horizontally disposed and the other rising therefrom. A clamping plate 16 is attached to the outer end of the supporting bar 10, and the inner end of this plate overlies the horizontally disposed flange of the member 15, and may be clamped down upon this flange to secure the parts rigidly together by means of a clamping bolt 17. Graduations may be provided on the member 15, as indicated most clearly in Fig. 3, so that the angle which the saw makes with the main supporting bar 10 and rail R may be known.

Attached through hinges 18, Fig. 2, to the cross bar 14, is a frame 19 which rises from the cross bar. Arcute supporting bars 20 are secured to a lug 21 which is formed at the upper end of the frame 19, and have their free ends clamped against the upstanding flange of the member 15 by a clamping plate 22 which is held in place by the clamping bolt 23. These supporting bars serve to hold the frame 19 in selected position when the frame has been swung about its horizontal pivoting axis, and the bars may be graduated, as indicated, to provide a ready means for determining the angle through which the frame has been swung.

Secured in the frame 19, are the vertically disposed guide rods 24, herein shown as two in number, upon which are mounted, to slide longitudinally thereof, the sleeves 25, each formed with a pair of extending spaced eyes 26, which are adapted to receive the cross bars 27 of a saw frame with a close sliding fit.

Connected, in the usual manner, to the lower ends of the side bars 27' of the saw frame, is the saw blade 28, which is detachable, as is usual with hack saws. A connecting bar 29 extends between the cross bars 27 of the saw frame, to which bars it is attached, and to this connecting bar is pivotally secured one end of a lever 30. The lever 30 is pivotally secured between its ends to a lever 31, one end of which lever is pivotally connected to a guide rod 24, or other suitable portion of the frame, and the other end of which forms a handle by which the lever may be rocked about its pivot. A catch 33 may be pivoted to the upper portion of the frame 19 and may be swung to position to engage under the lever 31, when the handle of the lever is swung to its uppermost position, to hold the levers and the saw elevated so that the device may be readily placed in position on a rail.

The operation is as follows:—

When a rail is to be sawed, the saw is elevated by throwing up the lever 31 and latching it in such position, as just described. The set screws 12 being backed out to a sufficient extent, the main supporting bar 10 is placed upon the upper face of the ball of the rail with the clamps 11 straddling the ball, and the device moved to position to bring the saw upon that part of the rail at which the cut is to be made. The set screws are then threaded in to engage the side of the ball of the rail and clamp the device firmly in place.

If the cut is to be inclined transversely of the rail, the clamping bolt 17 is loosened to free the grip of the plate 16 upon the flange of the member 15, and allow the structure to be swung upon the pivot pin 13 until the saw makes the proper angle with the rail. The plate 16 is then clamped in place; the catch released to permit the saw to lower upon the rail; the handle end of lever 31 forced downwardly to retain the saw in engagement with the rail and the upper or handle end of the lever 30 oscillated to reciprocate the saw across the rail and cause the rail to be cut.

If the rail is to be cut on an angle to the vertical, the device is set in position as just described and the clamping plate 22 loosened to release the supporting bars 20 and permit the frame 19 to be swung on its hinges to the desired angle. The plate 22 is then reclamped and the saw operated as described.

Having described the invention, what is claimed as new is:—

1. A rail saw, including a supporting bar, a saw, means for supporting the saw on the bar to be swung about a vertical axis, means for locking the supporting means to the bar, a lever operable to reciprocate the saw, and means engaging the lever for forcing the saw against the work.

2. A rail saw, including a supporting bar, means for clamping the bar to a rail, a member supported on the bar to swing about a vertical axis, means for clamping the member to the bar, a frame supported on the member to swing about a horizontal axis, means for clamping the frame in fixed position with respect to the member, a saw supported by the frame and slidable thereon, means for reciprocating the saw, and means engaging the reciprocating means for forcing the saw against the rail.

3. A rail, including a supporting bar, means for clamping the bar to a rail, a frame supported on the bar, a saw supported by and slidable on the frame, a lever pivoted to the frame and operable to force the saw against the rail, and a lever pivoted to the first mentioned lever and operable to reciprocate the saw.

4. A rail saw, including a supporting bar, means for clamping the bar to a rail, a frame supported on the bar, a saw supported by and slidable on the frame, means for reciprocating the saw, a lever pivoted to the frame and engaging the reciprocating means for forcing the saw against the rail, and a catch secured to the frame and engageable with the lever for holding the saw out of contact with the rail.

5. In a saw, a base plate adapted to be secured to the object to be cut, a frame mounted on the base plate including vertical side bars, sleeves mounted on the guides, eyes formed on the sleeves, a saw, including parallel bars, the bars being slidably mounted in the eyes, a lever pivotally connected with the saw, and a second lever pivotally connected with the frame and with the first-mentioned lever whereby to raise and lower the saw.

6. In a saw, a clamping plate adapted to be mounted on the object to be cut, an axially adjustable frame, means for retaining the frame in adjusted position, a saw frame mounted on the first-mentioned frame and capable of both vertical and horizontal movement, a lever for raising and lowering the saw frame, and a second lever for reciprocating the saw frame.

7. A rail saw, including a supporting bar, clamping members having connection with the supporting bar for clamping the supporting member to the rail, a semi-circular frame pivotally connected to the supporting member to permit the semi-circular member to be adjusted in a horizontal plane, a frame member having one of its ends pivotally connected to the semi-circular member, to permit the same to be adjusted in a plane, at an angle to the vertical, a saw supported by the frame member to reciprocate, a lever having connection with the saw for reciprocating the same, a lever connected to the frame, and having connection with the operating lever, for holding the saw to its work, and means for supporting the saw out of contact with its work.

In testimony that I claim the foregoing as my own, I have hereto affixed my signature in the presence of two witnesses.

GEORGE HENRY RUSSELL.

Witnesses:
W. W. OSBORNE,
HORTENSE C. WADE.